(12) United States Patent
Gadhe et al.

(10) Patent No.: US 11,689,567 B2
(45) Date of Patent: *Jun. 27, 2023

(54) MAPPING AN ATTACK TREE AND ATTACK PREDICTION IN INDUSTRIAL CONTROL AND IIOT ENVIRONMENT USING HASH DATA ANALYTICS

(71) Applicant: Honeywell International Inc., Morris Plains, NJ (US)

(72) Inventors: Ganesh Patilba Gadhe, Phoenix, AZ (US); Steven Louie Ypma, Suwanee, GA (US); Doug Swain, Dover, NH (US); Virgil Mehalek, Dover, NH (US)

(73) Assignee: Honeywell International Inc., Morris Plains, NJ (US)

( * ) Notice: Subject to any disclaimer, the term of this patent is extended or adjusted under 35 U.S.C. 154(b) by 323 days.

This patent is subject to a terminal disclaimer.

(21) Appl. No.: 16/811,837

(22) Filed: Mar. 6, 2020

(65) Prior Publication Data

US 2021/0281604 A1 Sep. 9, 2021

(51) Int. Cl.
*H04L 29/06* (2006.01)
*H04L 9/40* (2022.01)
*G06F 16/903* (2019.01)
*G06F 16/901* (2019.01)

(52) U.S. Cl.
CPC ........ *H04L 63/1466* (2013.01); *G06F 16/903* (2019.01); *G06F 16/9014* (2019.01); *H04L 63/1416* (2013.01); *H04L 63/20* (2013.01)

(58) Field of Classification Search
CPC . H04L 63/1466; H04L 63/1416; H04L 63/20; H04L 63/123; H04L 63/145; H04L 63/1433; G06F 16/9014; G06F 16/903; G06F 21/552
See application file for complete search history.

(56) References Cited

U.S. PATENT DOCUMENTS 10,581,877 B2 * 3/2020 Kumar KN ........... H04W 12/12
10,708,282 B2 * 7/2020 Biller ..................... H04L 63/10
(Continued)

FOREIGN PATENT DOCUMENTS

EP 2819053 A1 * 12/2014 ............. G06F 21/53
EP 2963578 A1 * 1/2016 ............. G06F 21/56
(Continued)

OTHER PUBLICATIONS

Kim et al., "Attack Detection Application with Attack Tree for Mobile System using Log Analysis", Jan. 20, 2018 (Year: 2018).*

*Primary Examiner* — John B King
(74) *Attorney, Agent, or Firm* — Alston & Bird LLP

(57) ABSTRACT

A method, apparatus and computer program product for detecting malicious content and predicting cyberattacks are described herein. In the context of a method, the method receives a hash query comprising a file hash based on one or more files. The method queries a cyberattack case studies information database based on the hash query to generate one or more attack correlation information items associated with at least one of the one or more files. The method also generates and outputs a file security analysis based on the attack correlation information items for authorization of the one or more files.

20 Claims, 5 Drawing Sheets

(56) References Cited

U.S. PATENT DOCUMENTS

| | | | | |
|---|---|---|---|---|
| 2003/0088680 A1* | 5/2003 | Nachenberg | ........ | H04L 63/0227 |
| | | | | 709/229 |
| 2004/0172551 A1* | 9/2004 | Fielding | ................ | G06F 21/564 |
| | | | | 713/176 |
| 2016/0323295 A1* | 11/2016 | Joram | .................... | H04L 63/145 |
| 2017/0351877 A1* | 12/2017 | Knapp | .................... | G06F 21/78 |
| 2020/0344248 A1* | 10/2020 | De Jesus | ............. | H04L 63/1425 |

FOREIGN PATENT DOCUMENTS

| | | | | |
|---|---|---|---|---|
| WO | WO-2005060525 A2 * | 7/2005 | ........... | G06F 21/577 |
| WO | WO-2016025226 A1 * | 2/2016 | ........... | G06F 21/577 |

* cited by examiner

MAPPING AN ATTACK TREE AND ATTACK PREDICTION IN INDUSTRIAL CONTROL AND IIOT ENVIRONMENT USING HASH DATA ANALYTICS

TECHNOLOGICAL FIELD

Embodiments of the invention generally relate to programmatically detecting malicious content and predicting cyberattacks in an industrial control system using hash analytics.

BACKGROUND

In some examples and in industrial control systems (ICS) and industrial internet of things (IIoT) environments, identifying and taking preventive actions against harmful cyberattacks on computing devices operating in an ICS computing environment has historically been difficult. Applicant has identified a number of deficiencies and problems associated with attack detection and prediction in industrial control systems. Through applied effort, ingenuity, and innovation, many of these identified problems have been solved by developing solutions that are included in embodiments of the present disclosure, many examples of which are described in detail herein.

BRIEF SUMMARY

This specification relates to methods, systems, apparatuses, and computer program products for detecting malicious content and predicting cyberattacks in an industrial control system using hash analytics.

In an example embodiment, a computer-implemented method for malicious content detection and attack prediction in an industrial control system is provided, the computer-implemented method comprising receiving a hash query from a secure media exchange node, wherein the hash query comprises a file hash generated at the secure media exchange node based at least in part on one or more files received at the secure media exchange node. The computer-implemented method further comprises querying a cyberattack case studies information database based on the hash query to generate one or more attack correlation information items associated with at least one of the one or more files by comparing the hash query with file hashes stored in the cyberattack case studies information database. The computer-implemented method further comprises generating a file security analysis regarding the one or more files based on the one or more attack correlation information items. The computer-implemented method further comprises outputting the file security analysis to a secure media exchange threat intelligence portal associated with the secure media exchange node for authorization of the one or more files.

In some embodiments of the computer-implemented method, the cyberattack case studies information database comprises a historical threat intelligence database configured to store at least one or more historically received file hashes representing one or more malicious content items, and querying the cyberattack case studies information database further comprises querying the historical threat intelligence database with the hash query and, upon determining that the file hash in the hash query matches at least one of the one or more historically received file hashes, generating one or more historical threat indicators representing the one or more malicious content items, wherein the one or more attack correlation information items comprise the one or more historical threat indicators.

In some embodiments of the computer-implemented method, the one or more malicious content items are each associated with one of the one or more file hashes. In some embodiments of the computer-implemented method, the one or more malicious content items are one or more of: one or more known viruses, one or more malware tools, or one or more software tools historically utilized in connection with a cyberattack. In some embodiments of the computer-implemented method, the cyberattack case studies information database comprises a cyberattack correlation and prediction database configured to store one or more hashes associated with one or more malicious content items, and querying the cyberattack case studies information database further comprises querying the cyberattack correlation and prediction database with the hash query, receiving one or more predictive indicators, wherein each of the one or more predictive indicators are based on an attack tree mapping associated with the hash file and generating the file security analysis based at least on the one or more predictive indicators. In some embodiments of the computer-implemented method, the one or more predictive indicators include one or more of: an indication of one or more attack phases, and an indication of one or more additional file hashes associated with the file hash. In some embodiments the computer-implemented method further comprises outputting a notification associated with the file security analysis to a user device of a user associated with the secure media exchange node.

In an example embodiment, an apparatus configured to detect malicious content and predict attacks in an industrial control system is provided, the apparatus comprising at least one processor and at least one non-transitory memory including program code, the at least one non-transitory memory and the program code configured to, with the processor, cause the apparatus to at least receive a hash query from a secure media exchange node, wherein the hash query comprises a file hash generated at the secure media exchange node based at least in part on one or more files received at the secure media exchange node. The memory including the program code is further configured to, with the processor, cause the apparatus to query a cyberattack case studies information database based on the hash query to generate one or more attack correlation information items associated with at least one of the one or more files by comparing the hash query with file hashes stored in the cyberattack case studies information database. The memory including the program code is further configured to, with the processor, cause the apparatus to generate a file security analysis regarding the one or more files based on the one or more attack correlation information items. The memory including the program code is further configured to, with the processor, cause the apparatus to output the file security analysis to a secure media exchange threat intelligence portal associated with the secure media exchange node for authorization of the one or more files.

In some embodiments of the apparatus, the cyberattack case studies information database comprises a historical threat intelligence database configured to store at least one or more historically received file hashes representing one or more malicious content items, and the at least one non-transitory memory and the program code that is configured to, with the processor, cause the apparatus to at least query the cyberattack case studies information database is further configured to query the historical threat intelligence database with the hash query and, upon determining that the file hash in the hash query matches at least one of the one or more historically received file hashes, generate one or more historical threat indicators representing the one or more malicious content items, wherein the one or more attack correlation information items comprise the one or more historical threat indicators. In some embodiments of the apparatus, the one or more malicious content items are each associated with one of the one or more file hashes. In some embodiments of the apparatus, the one or more malicious content items are one or more of: one or more known viruses, one or more malware tools, or one or more software tools historically utilized in connection with a cyberattack.

In some embodiments of the apparatus, the cyberattack case studies information database comprises a cyberattack correlation and prediction database configured to store one or more hashes associated with one or more malicious content items, and the at least one non-transitory memory and the program code that is configured to, with the processor, cause the apparatus to at least query the cyberattack case studies information database is further configured to query the cyberattack correlation and prediction database with the hash query, receive one or more predictive indicators, wherein each of the one or more predictive indicators are based on an attack tree mapping associated with the hash file, and generate the file security analysis based at least on the one or more predictive indicators. In some embodiments of the apparatus, the one or more predictive indicators include one or more of: an indication of one or more attack phases, and an indication of one or more additional file hashes associated with the file hash. In some embodiments of the apparatus, the memory including the program code is further configured to, with the processor, cause the apparatus to output a notification associated with the file security analysis to a user device of a user associated with the secure media exchange node.

In an example embodiment, a computer program product is provided comprising at least one non-transitory computer-readable storage medium having computer-readable program code portions stored therein, the computer-readable program code portions comprising an executable portion configured to receive a hash query from a secure media exchange node, wherein the hash query comprises a file hash generated at the secure media exchange node based at least in part on one or more files received at the secure media exchange node. The computer-readable program code portions comprising an executable portion are further configured to query a cyberattack case studies information database based on the hash query to generate one or more attack correlation information items associated with at least one of the one or more files by comparing the hash query with file hashes stored in the cyberattack case studies information database. The computer-readable program code portions comprising an executable portion are further configured to generate a file security analysis regarding the one or more files based on the one or more attack correlation information items. The computer-readable program code portions comprising an executable portion are further configured to output the file security analysis to a secure media exchange threat intelligence portal associated with the secure media exchange node for authorization of the one or more files.

In some embodiments of the computer program product, the cyberattack case studies information database comprises a historical threat intelligence database configured to store at least one or more historically received file hashes representing one or more malicious content items, and the computer-readable program code portions comprising an executable portion configured to query the cyberattack case studies information database are further configured to query the historical threat intelligence database with the hash query and, upon determining that the file hash in the hash query matches at least one of the one or more historically received file hashes, generate one or more historical threat indicators representing the one or more malicious content items, wherein the one or more attack correlation information items comprise the one or more historical threat indicators. In some embodiments of the computer program product, the one or more malicious content items are each associated with one of the one or more file hashes. In some embodiments of the computer program product, the one or more malicious content items are one or more of: one or more known viruses, one or more malware tools, or one or more software tools historically utilized in connection with a cyberattack.

In some embodiments of the computer program product, the cyberattack case studies information database comprises a cyberattack correlation and prediction database configured to store one or more hashes associated with one or more malicious content items, and the computer-readable program code portions comprising an executable portion configured to query the cyberattack case studies information database are further configured to query the cyberattack correlation and prediction database with the hash query, receive one or more predictive indicators, wherein each of the one or more predictive indicators are based on an attack tree mapping associated with the hash file, and generate the file security analysis based at least on the one or more predictive indicators. In some embodiments of the computer program product, the one or more predictive indicators include one or more of: an indication of one or more attack phases, and an indication of one or more additional file hashes associated with the file hash. In some embodiments of the computer program product, the computer-readable program code portions comprising the executable portion are further configured to output a notification associated with the file security analysis to a user device of a user associated with the secure media exchange node.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
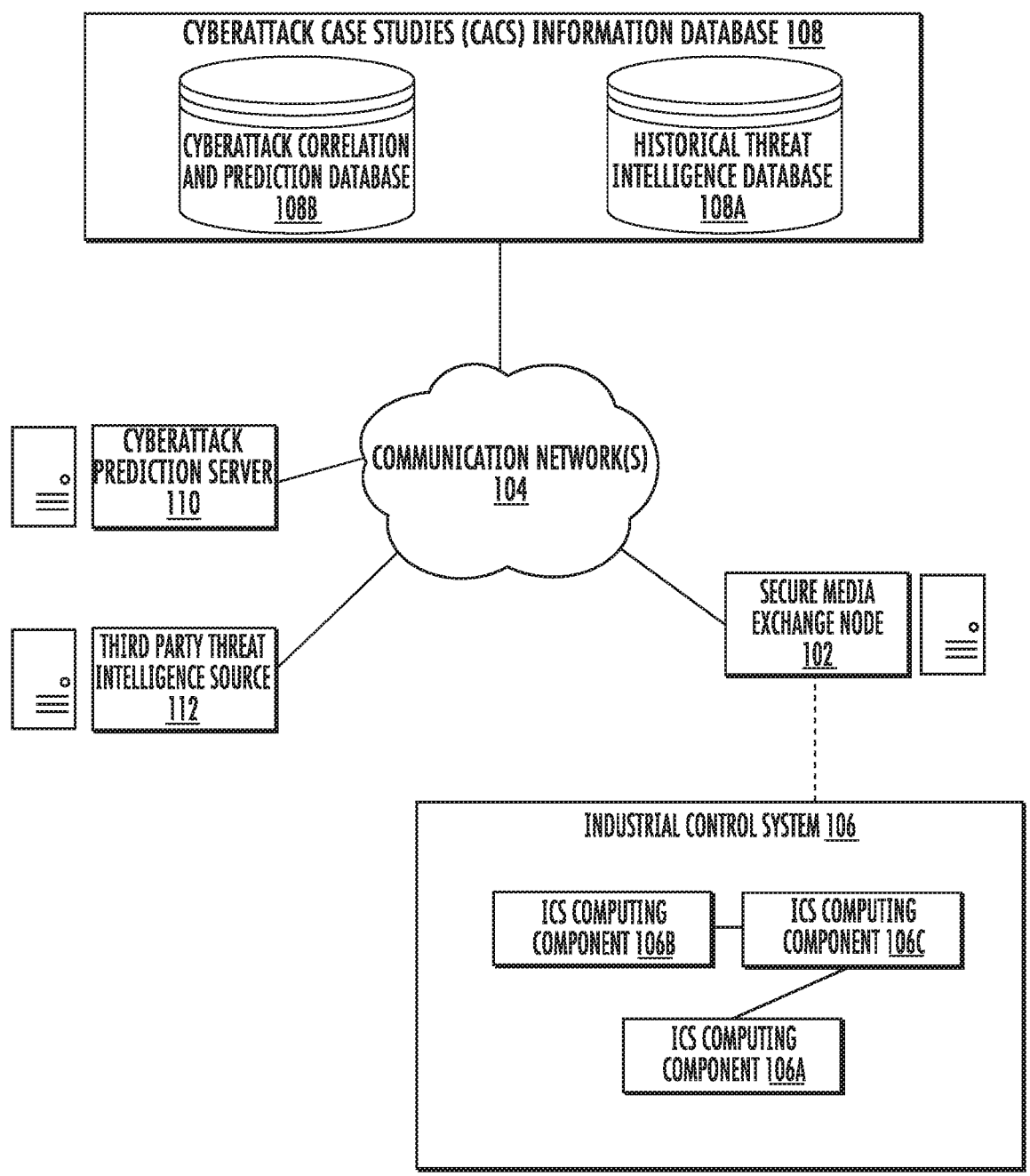

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings.

Figure 2:
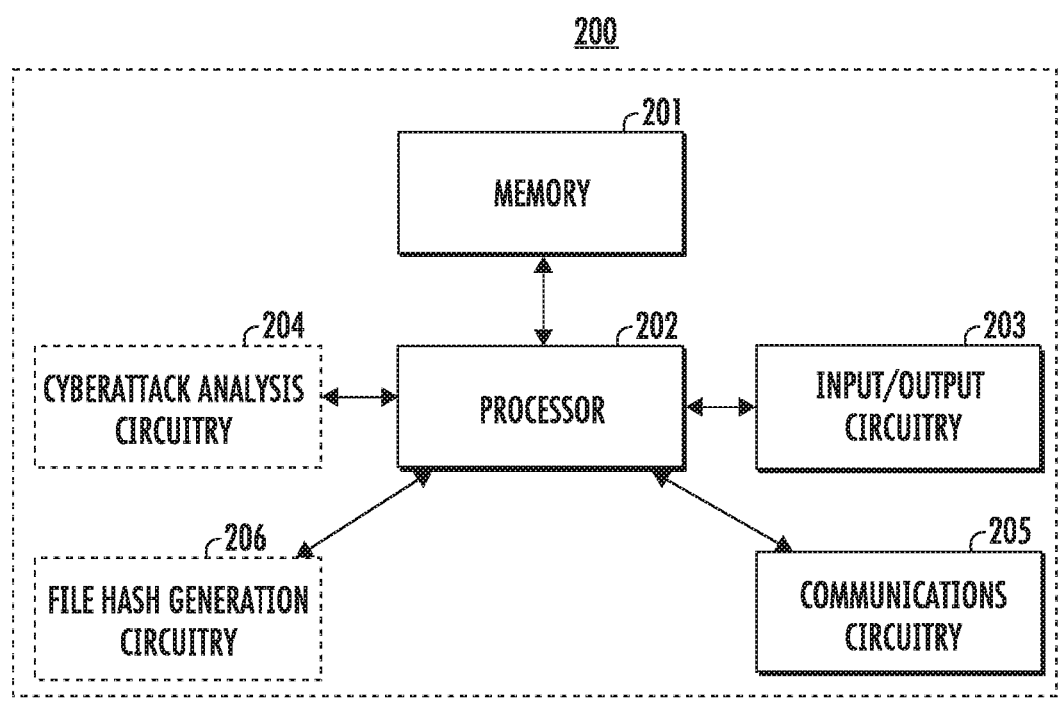
Figure 3:
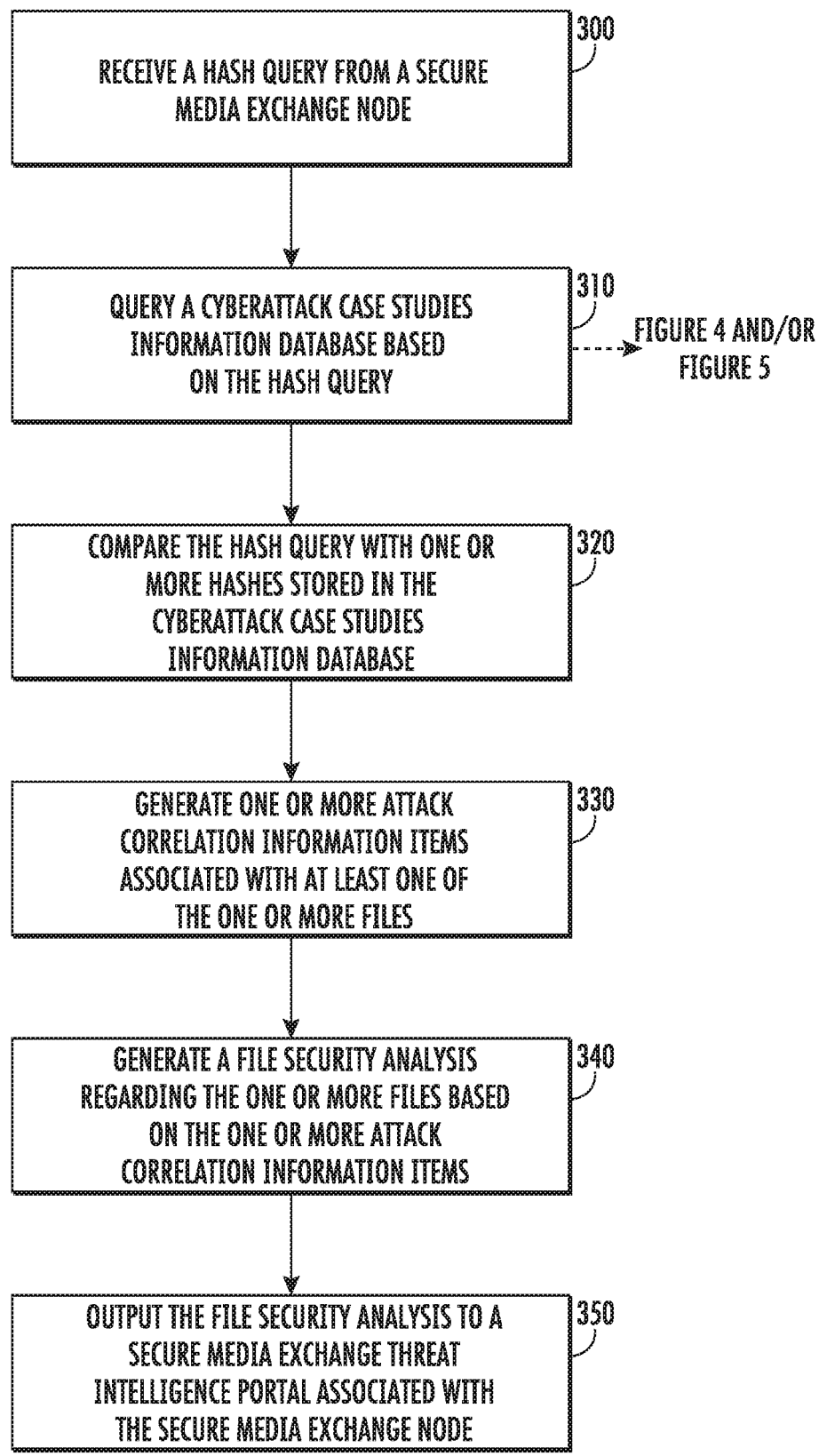
Figure 4:
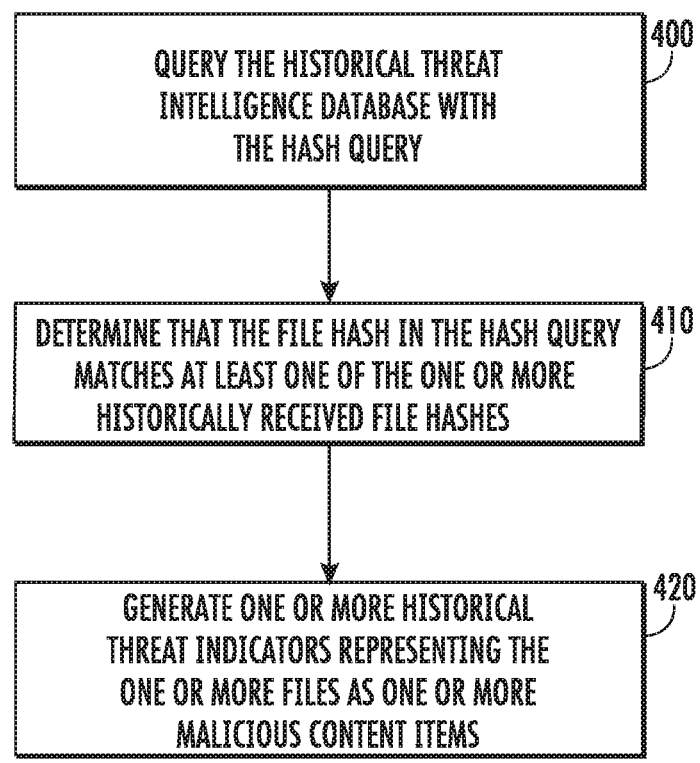
Figure 5:
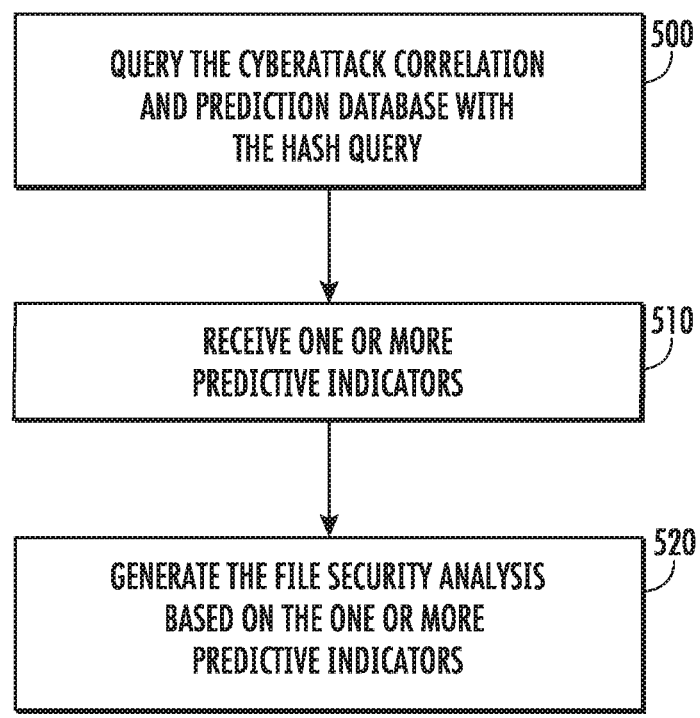

FIG. 1 is a system architecture diagram of an embodiment of the present disclosure;

FIG. 2 is a schematic diagram of an exemplary computing entity according to one embodiment of the present disclosure;

FIG. 3 is a flowchart illustrating operations for detecting malicious content and predicting cyberattacks using hash analytics according to embodiments of the present disclosure;

FIG. 4 is another flowchart illustrating operations for detecting malicious content and predicting cyberattacks using a historical threat intelligence database according to embodiments of the present disclosure; and FIG. 5 is another flowchart illustrating operations for detecting malicious content and predicting cyberattacks using a cyberattack correlation and prediction database according to embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

The phrases "in one embodiment," "according to one embodiment," "in some embodiments," and the like generally refer to the fact that the particular feature, structure, or characteristic following the phrase may be included in the at least one embodiment of the present disclosure. Thus, the particular feature, structure, or characteristic may be included in more than one embodiment of the present disclosure such that these phrases do not necessarily refer to the same embodiment.

The term "example" or "exemplary" is used herein to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including" and variants thereof are used in either the detailed description or the claims, these terms are intended to be inclusive in a manner similar to the term "comprising."

If the specification states a component or feature "may," "can," "could," "should," "would," "preferably," "possibly," "typically," "optionally," "for example," "in some examples," "often," or "might" (or other such language) be included or have a characteristic, that a specific component or feature is not required to be included or to have the characteristic. Such component or feature may be optionally included in some embodiments, or it may be excluded.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

As used herein, the terms "data," "content," "digital content," "digital content object," "information," and similar terms may be used interchangeably to refer to data capable of being transmitted, received, and/or otherwise stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

The term "industrial control system" (ICS) refers to a computing system that includes one or more industrial control system computing components that each are connected to a device or machinery in an industrial system. For example, an ICS may be a supervisory control and data acquisition system that includes several programmable logic controllers distributed in various locations that provide long distance monitoring and control of field sites through a centralized control system. In another example, an ICS may be a distributed control system that is configured to control various ICS computing components that take the form of operational technology hardware and software systems. The ICS computing components that take the form of operational technology hardware and software systems may be various controllers that control an industrial production process.

The term "ICS computing component" refers to computing hardware and software system in an ICS. For example, the ICS computing component may take the form of operational technology hardware and software systems that monitor or control physical devices in the industrial system. Example physical devices include manufacturing equipment, monitoring equipment such as storage or device monitoring equipment, manufacturing material moving equipment, or other equipment used in an industrial production site. The ICS computing component may also take the form of a programmable logic controller that provides local management of processes being run through feedback devices such as sensors and actuators. The ICS computing component may also take other forms such as a master terminal unit in a supervisory control and data acquisition system that is configured to transmit commands to or receive information from one or more remote terminal units, a remote terminal unit, a human machine interface, a control server, intelligent electronic devices that is associated with another physical device in the industrial system, or the like.

The term "secure media exchange node" refers to computer hardware and/or software configured to receive one or more files and generate a file hash of the one or more files. In some embodiments, the one or more files may be stored on a plug and play portable storage device or other storage medium configured to file storage. For example, the one or more files may be stored on a universal serial bus (USB) based storage device, or other physical, portable storage device, such as flash-based storage, memory-card based storage, and/or the like, and, in some embodiments, the storage device is intended to be connected to one or more ICS computing components. For example, the USB based storage device may be connected to the secure media exchange node before the USB based storage device is connected to the ICS computing component to transmit the one or more files to the ICS computing component. In some embodiments, the secure media exchange node may be a device physically located within an industrial production site that the ICS operates in.

The term "file security analysis" refers to a file or data structure representing one or more cyberattack threats or potential cyberattack threats that may be present in one or more files received at a secure media exchange node. For example, a file security analysis may include data representative of one or more known cyberattack threats based on historical data, data representative of one or more attack phases associated with the one or more files, and/or data indicating that one or more files potentially comprise malicious content. In some embodiments, the file security analysis may be generated based on one or more attack correlation information items.

The term "attack correlation information item" refers to data generated by or received by a cyberattack prediction server regarding one or more files and based on file hashes of the one or more files received from a secure media exchange node. Example attack correlation information items may include data based on historical threat indicators representing one or more known file hashes associated with malicious content based on historical data, predictive indicators representing potential cyberattacks that take the form of an attack phase associated with at least one of the one or more files and/or one or more additional file hashes associated with at least one of the one or more files (e.g., associated files in an attack tree mapping), and/or other additional data.

The term "historical threat indicator" refers to a data structure generated by a cyberattack prediction server based on a matching of file hashes received from a secure media exchange node and a file hash stored in a cyberattack case studies information database (e.g., in a historical threat intelligence database). A historical threat indicator represents a known cyberattack threat associated with one or more files received at the secure media exchange node.

The term "predictive indicator" refers to a data structure for predicting cyberattack information associated with a file. A predictive indicator may be stored along with a file hash of the file. In some embodiments, a predictive indicator may include, by way of example, one or more of: an indication of one or more attack phases associated with the file hash, one or more additional file hashes associated with the file hash in an attack tree mapping, or another form of indicator associated with the one or more file hashes.

The term "secure media exchange threat intelligence portal" refers to an interface configured to render data included in a file security analysis. For example, the secure media exchange threat intelligence portal may take the form of a web-based portal that is accessible to one or more devices, such as a user device (e.g., computer, tablet, mobile phone, and/or the like) belonging to a user (e.g., a system administrator, employee, and/or the like). In some embodiments, the secure media exchange threat intelligence portal may be rendered on the secure media exchange node. In some embodiments, the secure media exchange threat intelligence portal may be rendered on another device.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more secure media exchange nodes. Additionally, or alternatively, the computing device may include fixed computing devices, such as a personal computer, a tablet, or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices. Additionally, or alternatively, the computing device may include programmable logic controllers, microcontrollers, intelligent electronic devices that is associated with physical device in the industrial system, and/or other computing devices that may be used to embody ICS computing components.

FIG. 1 illustrates a system architecture diagram of example embodiments of the present disclosure. The secure media exchange node 102 may be embodied, for example, as a computer, a tablet computer, or the like. In some embodiments, secure media exchange node 102 is configured to receive one or more files (e.g., to be later transmitted to and/or otherwise associated with the industrial control system 106). The industrial control system 106 may include one or more ICS computing components 106A to 106C. In some embodiments, the industrial control system 106 may be a computing system that is not connected to the communication network 104, or any communication network that may connect to the Internet. In some embodiments, the one or more files may be stored on a portable storage device, such as a USB based storage device to be connected to an ICS computing component, such as one of ICS computing components 106A to 106C that is, in some examples, associated with the one or more files. For example, the USB based storage device may be connected to the secure media exchange node before the USB based storage device is connected to the ICS computing component to transmit the one or more files to the ICS computing component and/or authorize the one or more files for use (e.g., installation) on the ICS computing component.

The secure media exchange node 102 may communicate with, via the communication network 104, a cyberattack prediction server 110. In some embodiments, the secure media exchange node 102 may transmit file hashes of the one or more files to the cyberattack prediction server 110 via the communication network 104. In some example embodiments, the secure media exchange node 102 may be a device physically located within an industrial production site that the industrial control system operates in. In some embodiments, the secure media exchange node 102 may be embodied as a computer or computers. In some embodiments, the secure media exchange node 102 may not be directly connected to the ICS 106 via any form of connection network; in such embodiments, for example, the secure media exchange node 102 may receive the one or more files via the USB based storage device.

In some embodiments, the cyberattack prediction server 110 may query the cyberattack case studies information database 108 with a file hash received from the secure media exchange node 102. The cyberattack prediction server 110 may be embodied as a computer or computers, such as, for example, apparatus 200 in FIG. 2. The cyberattack prediction server 110 may provide for receiving of electronic data from various sources, including but not necessarily limited to the secure media exchange node 102. For example, the cyberattack prediction server 110 may be operable to transmit and receive file hashes to or from the secure media exchange node 102. In some embodiments, the cyberattack prediction server 110 may be in communication with the cyberattack case studies information database 108 through the communication network 104.

The cyberattack case studies information database 108 may include one or more databases, such as a historical threat intelligence database 108A and a cyberattack correlation and prediction database 108B. In some embodiments, the cyberattack case studies information database 108 may store one or more file hashes (e.g., in the historical threat intelligence database 108A). In some embodiments, the one or more file hashes may be also associated with one or more predictive indicators, one or more historical threat indicators, and/or the like.

Communications network 104 may include any wired or wireless communication network including, for example, a wired or wireless Personal Area Network (PAN), Local Area Network (LAN), Metropolitan Area Network (MAN), Wide Area Network (WAN), and/or the like. For example, in various embodiments, the one or more communication networks 104 described herein may use any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Bluetooth protocols, wireless universal serial bus (USB) protocols, and/or any other wireless protocol.

The cyberattack case studies information database 108 may be embodied as a data storage device such as a Network Attached Storage (NAS) device or devices, or as a separate database server or servers. The cyberattack case studies information database 108 may comprise file hashes of one or more files and data associated with the file hashes. For example, the cyberattack case studies information database 108 may include, without limitation, predictive indicators associated with the file hashes, historical threat indicators associated with the file hashes, or the like. The cyberattack case studies information database 108 may include a historical threat intelligence database 108A and a cyberattack correlation and prediction database 108B. In some embodiments, the historical threat intelligence database 108A includes one or more file hashes which are file hashes for files associated with known malicious content. In some embodiments, the cyberattack correlation and prediction database 108B includes one or more predictive indicators associated with one or more file hashes.

In some embodiments, the cyberattack case studies information database 108 may be periodically updated by communicating, via the communication network 104, with a third-party threat intelligence source 112. In some embodiments, the third-party threat intelligence source 112 may be embodied as a separate database server or servers managed by an entity that is different from the entity managing the secure media exchange node 102. In some embodiments, the cyberattack case studies information database 108 may be updated manually by one or more administrators (e.g., database administrators, system administrators, and/or the like) associated with the industrial control system 106 and/or secure media exchange node 102.

In some embodiments, the cyberattack case studies information database 108 may be in communication with the cyberattack prediction server 110 through the communication network 104. In some embodiments, the cyberattack case studies information database 108 may be contained in the cyberattack prediction server 110.

Example System Configuration

The secure media exchange node 102 or the cyberattack prediction server 110 may be embodied by one or more computing systems and include one or more components shown in circuitry 200 in FIG. 2. The circuitry 200 may include a processor 202, a memory 201, input/output circuitry 203, communications circuitry 205, and optionally the cyberattack analysis circuitry 204 (for the cyberattack prediction server 110) or file hash generation circuitry 206 (for the secure media exchange node 102). The circuitry 200 may, in some embodiments, also include the cyberattack case studies information database 108. In some embodiments, for example, the cyberattack case studies information database 108 may be stored on the memory 201. The circuitry 200 may be configured to execute the operations described herein. Although these components 110 and 201-206 are described with respect to functional limitations, it should be understood that the particular implementations necessarily include the use of particular hardware. It should also be understood that certain of these components 110 and 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the circuitry 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, identifiers, requests, communications, or the like, for enabling the apparatus to carry out various functions in accordance with example embodiments of the present disclosure.

The memory 201 may include a non-volatile computer-readable storage medium such as a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the circuitry 200 may include input/output circuitry 203 that may, in turn, be in communication with processor 202 to provide output to a user and, in some embodiments, to receive an indication of a user input. The input/output circuitry 203 may comprise a user interface and may include a display and may comprise a web user interface, a mobile application, a kiosk, or the like. In some embodiments, the input/output circuitry 203 may also include a keyboard, a mouse, a joystick, a touch screen, touch areas, soft keys, a microphone, a speaker, and/or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the circuitry 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The cyberattack analysis circuitry 204 includes hardware configured to generate a file security analysis. The cyberattack analysis circuitry 204 may utilize processing circuitry, such as the processor 202, to perform these actions. The cyberattack analysis circuitry 204 may send and/or receive data from cyberattack case studies information database 108. In some embodiments, the sent and/or received data may be file hashes, historical threat indicators, predictive indicators, and/or the like. It should also be appreciated that, in some embodiments, the cyberattack analysis circuitry 204 may include a separate processor, specially configured field programmable gate array (FPGA), or application specific interface circuit (ASIC).

The file hash generation circuitry 206 includes hardware configured to generate one or more file hashes of one or more files received. The file hash generation circuitry 206 may utilize processing circuitry, such as the processor 202, to perform these actions. It should also be appreciated that, in some embodiments, the cyberattack analysis circuitry 204 may include a separate processor, specially configured field programmable gate array (FPGA), or application specific interface circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Overview

In some examples, a cyberattack may comprise any attempt to expose, alter, disable, destroy, steal, or otherwise gain unauthorized access to and/or make unauthorized use of an asset, such as, for example, one or more computer information systems, infrastructures, computer networks, and/or personal computer devices. In some examples, cyberattacks may be defined as either an active cyberattack or a passive cyberattack. An active cyberattack may be described as a cyberattack that attempts to alter system resources or affect system operation (e.g., a computer virus). A passive cyberattack may be described as a cyberattack that attempts to learn or make use of information from a system but does not affect system resources (e.g., wiretapping, key logging, and/or the like).

In some examples, a cyberattack may take the form of an inside cyberattack or an outside cyberattack. In some examples, an inside cyberattack may be described as a cyberattack initiated by an entity inside a security perimeter (an insider), or in other words, an entity that is authorized to access system resources but uses them in a way not approved by those who granted the authorization. Likewise, and in some examples, an outside cyberattack may be initiated from outside a security perimeter, such as by an unauthorized or illegitimate user of the system (an outsider). Some examples of outsiders may include amateur hackers, organized criminals, international terrorists, hostile governments, and/or the like.

In some examples, a cyberattack may be carried out in phases. During an initial reconnaissance phase, an attacker may form an attack strategy by identifying a target (e.g., a computer system or the like), researching the target, and/or exploring ways to exploit the target. During a scanning phase, the attacker may begin to search for vulnerabilities in the target.

Next, during an exploitation phase, the attacker may begin a cyberattack. For example, during the exploitation phase, the attacker may explore the target (e.g., a system, network, or the like) to understand information such as traffic flow, connected systems, and/or how to additionally exploit those systems. During an access maintenance phase, an attacker may gather as much data as possible, and additionally, set up a clear method of maintaining access to the target (e.g., through use of a backdoor, rootkit, and/or the like).

During an exfiltration phase, theft of sensitive data may occur. Lastly, during an identification prevention phase, the attacker may take preventative actions to avoid being detected, such as, for example, file hiding, log editing, covert channels, and/or similar actions.

Each phase of a cyberattack may be carried out using malicious content such as one or more tools, such as, for example, files and/or other software such as viruses, malware, spyware, rootkits, trojan horses, and/or the like. In other words, different phases of attack may be associated with one or more files. As an example, a backdoor or rootkit may be utilized during the access maintenance phase, whereas an installation of key logging software may take place during an exploitation phase.

Measures taken to combat cyberattacks may be inadequate in cases in which attacks do not occur over a network, such as during an inside cyberattack as described above in which an attacker has physical, direct access to the environment and utilizes malicious content such as malware and/or other destructive tools stored on a portable storage device.

For example, preventative measures in these scenarios may require additional infrastructure, resources, and experts. Additionally, there may be no way to correlate the tools being used (e.g., files such as viruses, rootkits, and/or the like) with cyberattack phases, such that a system administrator and/or the like may be made aware of what phase of a cyberattack is likely being executed based on the one or more tools utilized in the attack, and thus, what other files may have been already utilized during a prior phase of the cyberattack.

Thus, example systems for detecting malicious content and predicting cyberattacks which utilize hash analytics and generate and output detailed analysis regarding a cyberattack are disclosed herein and improve upon conventional, lacking methods of cyberattack prediction. Example benefits of this approach include preemptively providing users (e.g., system administrators, employees, customers, or the like) with information regarding predicted cyberattacks to better protect an environment such as an industrial control system, as well as providing detailed analysis on types of malicious content attempting to be utilized and at what stage of the predicted cyberattack the malicious content may be associated with, such that the user may be made aware of other potential malicious content that may already have affected the environment.

Example System Operations

Referring now to FIG. 3, a flowchart is provided to illustrate operations that are executed by an example embodiment of an apparatus used to embody various components illustrated in FIG. 1, such as the cyberattack prediction server 110, for programmatically detecting malicious content and predicting cyberattacks in an industrial control system. FIG. 3 and other flowcharts herein are for illustrative purposes and are not to be limiting unless otherwise stated herein. Unless otherwise noted, various operations discussed in FIG. 3 and other flowcharts may be used in the same or separate embodiments of the present disclosure.

In some embodiments, a secure media exchange node 102 may receive one or more files. The secure media exchange node 102 may use the file hash generation circuitry 206 to generate one or more file hashes of the one or more files. For example, in some embodiments, the file hash generation circuitry 206 may comprise a hash function and associated hash tables or the like to map data (e.g., the one or more files) to fix-sized values. In this regard, a file hash may comprise a unique value that corresponds to the content of one or more files. The secure media exchange node 102 may transmit a hash query that includes the one or more file hashes to the cyberattack prediction server 110. As shown in Block 300 of FIG. 3, the cyberattack prediction server 110 is configured to receive a hash query from a secure media exchange node 102.

In some embodiments, the industrial control system may be a computing system that is not connected to the communication network 104, or any communication network that may connect to the Internet. In some embodiments, the one or more files may be stored on a USB based storage device to be connected to one or more ICS computing components.

For example, the USB based storage device may be connected to the secure media exchange node before the USB based storage device is connected to one or more ICS computing components to, for example, transmit and/or install the one or more files to the ICS computing components, and/or, in some embodiments, for purposes of authorization of the USB based storage device.

In this regard, the secure media exchange node 102 may be configured to authorize and/or otherwise permit a removable storage device, such as a USB based storage device, to access, connect to, and/or interact with one or more ICS computing components in the ICS. For example, as described above, an instance may occur in which a person associated with the ICS (e.g., an employee, administrator, and/or the like) may attempt to enter the ICS with a USB based storage device comprising one or more files with the intent to connect the USB based storage device to one or more ICS computing components. In some examples, the one or more files may be non-harmful files, such as pre-approved update files (e.g., drivers or the like) for one or more ICS computing components, and/or other non-harmful files. In this regard, a USB based storage device may be unrecognizable to one or more ICS computing components via software or the like running on the one or more ICS computing components (e.g., when connected to the one or more ICS computing components) without first having been authorized, such as by secure media exchange node 102.

In some instances, the person attempting to access the ICS with a USB based storage device may have sinister intentions. For example, the person may be an outsider not associated with the ICS or, in some embodiments, may be an insider (e.g., an employee) associated with the ICS. In either case, the person may intend to use the USB based storage device within the ICS for nefarious purposes, such as to carry out a phase of a cyberattack by infecting and/or disabling one or more ICS computing components with one or more viruses, installing malware, spyware, and/or the like on one or more ICS computing components to steal sensitive information, and/or the like. For example, the USB based storage device may comprise one or more files associated with malicious content, such as one or more viruses, malware and/or other destructive tools.

As shown in Block 310 of FIG. 3, the cyberattack prediction server 110 is configured to query a cyberattack case studies (CACS) information database 108 based on the hash query. The CACS information database 108 may include one or more databases, such as a historical threat intelligence database 108A and a cyberattack correlation and prediction database 108B. In some embodiments, the CACS information database 108 may store one or more file hashes. In some embodiments, the one or more file hashes may be associated with one or more ICS computing component identifiers, one or more predictive indicators, one or more threat indicators, and/or the like. In some embodiments, a file hash not identified in the CACS information database 108 may be considered to be an unknown file hash.

The CACS information database 108 may be embodied as a data storage device such as a Network Attached Storage (NAS) device or devices, or as a separate database server or servers. The CACS information database 108 may comprise file hashes of one or more files known to be associated with malicious content. For example, the CACS information database 108 may include, without limitation, predictive indicators associated with the file hashes, threat indicators associated with the file hashes, or the like.

In this regard, as described above, the CACS information database 108 may include a historical threat intelligence database 108A and cyberattack correlation and prediction database 108B. In some embodiments, the historical threat intelligence database 108A includes one or more file hashes for files that have historically been received (e.g., via secure media exchange node 102). In some embodiments, at least a portion of the one or more file hashes stored at the historical threat intelligence database 108A are file hashes previous received (e.g., by secure media exchange node 102 and/or cyberattack prediction server 110) and previously determined to be associated with known malicious content.

As shown in Block 320 of FIG. 3, the cyberattack prediction server 110 is configured to compare the hash query with one or more hashes stored in the CACS information database. In this regard, the cyber attack prediction server 110 is configured to compare the hash query with one or more hashes stored in the CACS information database to determine whether the hash query comprises a hash that matches a hash stored in the CACS information database.

As shown in Block 330 of FIG. 3, the cyberattack prediction server 110, such as the cyberattack analysis circuitry 204, processor 202, and/or the like, is configured to generate one or more attack correlation information items associated with at least one of the one or more files. In some embodiments, the cyberattack prediction server 110 may generate the one or more attack correlation information items associated with at least one of the one or more files upon determining that the hash query matches at least one of the one or more hashes stored in the CACS information database. For example, as described further herein, one or more attack correlation information items may comprise one or more predictive indicators and/or one or more historical threat indicators.

As shown in Block 340 of FIG. 3, the cyberattack prediction server 110 is configured to generate a file security analysis regarding the one or more files based on the one or more attack correlation information items. A file security analysis may be embodied as a file or data structure representing one or more threats, such as malicious content or the like, that are present in the one or more files. For example, a file security analysis may include data representative of one or more known malicious content items and/or data indicating that the one or more files are potentially associated with malicious content.

As shown in Block 350 of FIG. 3, the cyberattack prediction server 110 is configured to output the file security analysis to a secure media exchange threat intelligence portal associated with the secure media exchange node 102. A secure media exchange threat intelligence portal is an interface configured to render data included in a file security analysis. For example, the secure media exchange threat intelligence portal may take the form of a web-based portal that is accessible to one or more computing entities. In some embodiments, the secure media exchange threat intelligence portal may be rendered on the secure media exchange node 102.

Referring now to FIG. 4, an additional flowchart is provided to illustrate operations that are executed by an example embodiment of an apparatus used to embody various components illustrated in FIG. 1, such as the cyberattack prediction server 110, for programmatically detecting malicious content and predicting cyberattacks in an industrial control system.

As shown in Block 400 of FIG. 4, the cyberattack prediction server 110 is configured to query a historical threat intelligence database 108A with a hash query, such as a hash query as discussed above, which may be received from a secure media exchange node 102. As previously described, the historical threat intelligence database 108A may be included as part of the ICS computing component hash information database 108 and is configured to store at least one or more historically received file hashes representing one or more malicious content items. The one or more malicious content items may be known cyberattack threats, such as backdoors, rootkits, viruses, trojan horses, and/or the like.

In some embodiments, for example, one or more files represented by one or more of the one or more historically received file hashes stored in the historical threat intelligence database may not necessarily be a malicious content item itself, but instead, may be associated with malicious content. For example, as described above, an attacker may use a plurality of tools, including malicious content items such as viruses, rootkits, and/or the like during a cyberattack.

However, the attacker may use one or more additional tools configured to perform one or more tasks that may assist in achieving a goal of the attacker and may not necessarily be malicious content. For example, tcpdump is an example data-network packet analyzer computer program that runs under a command line interface and allows a user to display packets being transmitted or received over a network. Common uses of tcpdump may include non-harmful operations, such as troubleshooting network errors and/or the like. However, tcpdump may also be used by an attacker to extract information about a potential target of a cyberattack (e.g., during a scanning phase). In this regard, the attacker may use tcpdump for the purpose of unauthorized interception and display of communications of another user or computer. For example, a file hash based on a tcpdump file may have been historically received (e.g., by cyberattack prediction server 110) and determined to be unsafe, and thus, stored at the historical threat intelligence database 108A.

As shown in Block 410 of FIG. 4, the cyberattack prediction server 110 is configured to determine that at least one file hash in the hash query matches at least one of the one or more historically received file hashes stored at historical threat intelligence database 108A.

As shown in Block 420 of FIG. 4, the cyberattack prediction server 110, such as the cyberattack analysis circuitry 204, processor 202, and/or the like, is configured to generate one or more historical threat indicators representing the one or more files as one or more malicious content items. In some embodiments, the information regarding the one or more malicious content items stored in the historical threat intelligence database may be fetched by the cyberattack prediction server 110 and included in the one or more historical threat indicators. In some embodiments, a respective historical threat indicator may be generated for each file hash in the hash query that matches the historically received hashes. In this regard, the one or more attack correlation information items generated (e.g., at Block 330 as described above) may include data based on the one or more historical threat indicators representing one or more known file hashes associated with malicious content based on historical data.

Referring now to FIG. 5, an additional flowchart is provided to illustrate operations that are executed by an example embodiment of an apparatus used to embody various components illustrated in FIG. 1, such as the cyberattack prediction server 110, for programmatically detecting malicious content and predicting cyberattacks in an industrial control system.

As shown in Block 500 of FIG. 5, the cyberattack prediction server 110 is configured to query the cyberattack correlation and prediction database 108B with the hash query. As previously described, the cyberattack correlation and prediction database 108B may be included in the CACS information database 108 and may include one or more predictive indicators associated with one or more file hashes. In some embodiments, the predictive indicators may be based on an attack tree mapping and may include one or more of: an indication of one or more attack phases associated with the one or more file hashes based on the attack tree mapping, an indication of one or more additional file hashes associated with the file hash based on the attack tree mapping, and/or another form of indication associated with the one or more file hashes.

For example, an attack tree mapping may be stored at the CACS database 108 (e.g., at the cyberattack correlation and prediction database) in association with a plurality of file hashes. An attack tree mapping may comprise a data structure that is configured to store associations between a plurality of file hashes. In some embodiments, the attack tree mapping may be based on one or more historically received file hashes (e.g., the one or more historically received file hashes stored in the historical threat intelligence database 108A). An attack tree mapping may further comprise indications of one or more attack phases associated with the one or more file hashes in the attack tree mapping.

As one example, a hash query received (e.g., at cyberattack prediction server 110) may comprise a first file hash, and, upon querying the historical threat intelligence database 108A with the hash query, it may be determined that the first file hash matches a historically received file hash stored at the historical threat intelligence database 108A associated with a particular malicious content item, TimeStomp. In some examples, TimeStomp may be malicious content in the form of software configured to modify the timestamps of a file (e.g., a modify, access, create, and/or change timestamp), in order to mimic files that are in the same directory. This may be done, for example, on files that have been modified or created by the adversary so that they do not appear conspicuous to forensic investigators or file analysis tools.

In this regard, the attack tree mapping associated with the TimeStomp file hash may be associated with an attack phase, such as an identification prevention phase as described above. Additionally, the attack tree mapping associated with the TimeStomp file hash may comprise one or more additional file hashes associated with malicious content, for example, that have been historically utilized in conjunction with TimeStomp. In one example, the TimeStomp file hash may be associated with a second file hash related to a particular malware virus. In this regard, both the TimeStomp file hash and the malware virus file hash may have been historically received (e.g., in the same hash query) at the cyberattack prediction server 110 and thus, the cyberattack prediction server 110 may be configured to generate an attack tree mapping comprising both the TimeStomp file hash and the malware virus hash.

In some embodiments, each of the one or more additional file hashes may further be associated with a respective attack phase. For example, an attack phase for a particular file hash may be determined by data received from one or more third-party threat intelligence sources 112. In some embodiments, an attack phase for a particular file hash may be determined based on historical data, such as historical cyberattack case studies and/or other intelligence provided to and stored at the cyberattack case studies information database 108 (e.g., by an administrator of the database and/or the like).

As shown in Block 510 of FIG. 5, the cyberattack prediction server 110 is configured to receive the one or more predictive indicators from the cyberattack correlation and prediction database. As described above, the one or more predictive indicators may be based on an attack tree mapping and may include one or more of: an indication of one or more attack phases associated with the one or more file hashes based on the attack tree mapping, an indication of one or more additional file hashes associated with the file hash based on the attack tree mapping.

As shown in Block 520 of FIG. 5, the cyberattack prediction server 110 is configured to generate the file security analysis based at least on the one or more predictive indicators. In some embodiments, by way of example, the file security analysis may be generated to comprise data associated with the predictive indicators. Continuing with the above TimeStomp example, the file security analysis may comprise information on whether the file hash had been previously received (e.g., based on one or more historical threat indicators) at the cyberattack prediction server 110 and/or the secure media exchange node 102, information comprising an attack phase associated with the particular file hash, and/or information comprising one or more additional malicious content items associated with the particular file hash. In this regard, the file safety analysis may provide a predictive analysis and provide a user (e.g., a database administrator, ICS employee or the like) with critical data related to one or more predicted malicious content items associated with the file hash. For example, the TimeStomp file hash may be associated with one or more additional file hashes representing malicious content based on an associated attack tree mapping. In an embodiment in which the TimeStomp file hash is associated with an identification prevention attack phase, this may indicate that malicious content associated with the one or more additional file hashes may have been already previously installed on or otherwise interacted with one or more ICS computing components in the ICS 106. In this regard, the file security analysis may provide an indication of prediction of one or more malicious content items that may have been previously brought into the ICS.

In some embodiments, in addition to outputting a file security analysis to a secure media exchange threat intelligence portal associated with the secure media exchange node, the cyberattack prediction server 110 may be further configured to output a notification associated with the file security analysis to a user device of a user associated with the secure media exchange node. In this regard, upon detection of malicious content attempting to enter the ICS (e.g., via the USB based storage device) and generating of a file security analysis based on the one or more files on the USB based storage device, a notification may be sent to an administrator or the like as to inform the administrator that the file security analysis is ready for urgent review at a secure media exchange threat intelligence portal.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

As described above, FIGS. 3, 4, and 5 illustrate flowcharts of apparatuses and methods according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for malicious content detection and attack prediction in an industrial control system, comprising:
   receiving a hash query associated with a system from a secure media exchange node, wherein the hash query comprises a file hash generated at the secure media exchange node based at least in part on one or more files received at the secure media exchange node;
   generating an attack tree based at least in part on a combination of a first hash for a first file and a second hash for a second file based on a determination that the first hash and the second hash historically were received in a same hash query;
   querying a cyberattack case studies information database based on the hash query to generate one or more attack correlation information items associated with at least one of the one or more files by comparing the hash query with file hashes stored in the cyberattack case studies information database;
   generating a file security analysis regarding the one or more files based on the one or more attack correlation information items, wherein the file security analysis comprises at least one indication of a predicted malicious content item predicted as previously brought into the system based at least in part on the one or more attack correlation information items,
   wherein querying the cyberattack case studies information database further comprises receiving at least one predictive indicator based at least in part on the attack tree, wherein the file security analysis comprises data representing that the file hash indicates the one or more files comprises the first file and the second file; and
   outputting the file security analysis to a secure media exchange threat intelligence portal associated with the secure media exchange node for authorization of the one or more files.

2. The computer-implemented method according to claim 1, wherein the cyberattack case studies information database comprises a historical threat intelligence database configured to store at least one or more historically received file hashes representing one or more malicious content items, and wherein querying the cyberattack case studies information database further comprises:
   querying the historical threat intelligence database with the hash query; and
   upon determining that the file hash in the hash query matches at least one of the one or more historically received file hashes, generating one or more historical threat indicators representing the one or more malicious content items, wherein the one or more attack correlation information items comprise the one or more historical threat indicators.

3. The computer-implemented method according to claim 2, wherein the one or more malicious content items are each associated with one of the one or more file hashes.

4. The computer-implemented method according to claim 2, wherein the one or more malicious content items are one or more of: one or more known viruses, one or more malware tools, or one or more software tools historically utilized in connection with a cyberattack.

5. The computer-implemented method according to claim 1, wherein the cyberattack case studies information database comprises a cyberattack correlation and prediction database configured to store one or more hashes associated with one or more malicious content items, and wherein querying the cyberattack case studies information database further comprises:
   querying the cyberattack correlation and prediction database with the hash query;
   receiving one or more predictive indicators, wherein each of the one or more predictive indicators are based on an attack tree mapping associated with the hash file; and
   generating the file security analysis based at least on the one or more predictive indicators.

6. The computer-implemented method according to claim 5, wherein the one or more predictive indicators include one or more of: an indication of one or more attack phases, and an indication of one or more additional file hashes associated with the file hash.

7. The computer-implemented method according to claim 1, further comprising:
   outputting a notification associated with the file security analysis to a user device of a user associated with the secure media exchange node.

8. An apparatus configured to detect malicious content and predict attacks in an industrial control system, the apparatus comprising at least one processor and at least one non-transitory memory including program code, the at least one non-transitory memory and the program code configured to, with the processor, cause the apparatus to at least:
   receive a hash query from a secure media exchange node, wherein the hash query comprises a file hash generated at the secure media exchange node based at least in part on one or more files received at the secure media exchange node;
   generate an attack tree based at least in part on a combination of a first hash for a first file and a second hash for a second file based on a determination that the first hash and the second hash historically were received in a same hash query;
   query a cyberattack case studies information database based on the hash query to generate one or more attack correlation information items associated with at least one of the one or more files by comparing the hash query with file hashes stored in the cyberattack case studies information database;
   generate a file security analysis regarding the one or more files based on the one or more attack correlation information items, wherein the file security analysis comprises at least one indication of a predicted malicious content item predicted as previously brought into the system based at least in part on the one or more attack correlation information items,
   wherein querying the cyberattack case studies information database further comprises receiving at least one predictive indicator based at least in part on the attack tree, wherein the file security analysis comprises data representing that the file hash indicates the one or more files comprises the first file and the second file; and output the file security analysis to a secure media exchange threat intelligence portal associated with the secure media exchange node for authorization of the one or more files.

9. The apparatus according to claim 8, wherein the cyberattack case studies information database comprises a historical threat intelligence database configured to store at least one or more historically received file hashes representing one or more malicious content items, and wherein the at least one non-transitory memory and the program code that is configured to, with the processor, cause the apparatus to at least query the cyberattack case studies information database is further configured to:
query the historical threat intelligence database with the hash query; and
upon determining that the file hash in the hash query matches at least one of the one or more historically received file hashes, generate one or more historical threat indicators representing the one or more malicious content items, wherein the one or more attack correlation information items comprise the one or more historical threat indicators.

10. The apparatus according to claim 9, wherein the one or more malicious content items are each associated with one of the one or more file hashes.

11. The apparatus according to claim 9, wherein the one or more malicious content items are one or more of: one or more known viruses, one or more malware tools, or one or more software tools historically utilized in connection with a cyberattack.

12. The apparatus according to claim 8, wherein the cyberattack case studies information database comprises a cyberattack correlation and prediction database configured to store one or more hashes associated with one or more malicious content items, and wherein the at least one non-transitory memory and the program code that is configured to, with the processor, cause the apparatus to at least query the cyberattack case studies information database is further configured to:
query the cyberattack correlation and prediction database with the hash query;
receive one or more predictive indicators, wherein each of the one or more predictive indicators are based on an attack tree mapping associated with the hash file; and
generate the file security analysis based at least on the one or more predictive indicators.

13. The apparatus according to claim 12, wherein the one or more predictive indicators include one or more of: an indication of one or more attack phases, and an indication of one or more additional file hashes associated with the file hash.

14. The apparatus according to claim 8, wherein the memory including the program code is further configured to, with the processor, cause the apparatus to:
output a notification associated with the file security analysis to a user device of a user associated with the secure media exchange node.

15. A computer program product comprising at least one non-transitory computer-readable storage medium having computer-readable program code portions stored therein, the computer-readable program code portions comprising an executable portion configured to:
receive a hash query from a secure media exchange node, wherein the hash query comprises a file hash generated at the secure media exchange node based at least in part on one or more files received at the secure media exchange node;
generate an attack tree based at least in part on a combination of a first hash for a first file and a second hash for a second file based on a determination that the first hash and the second hash historically were received in a same hash query;
query a cyberattack case studies information database based on the hash query to generate one or more attack correlation information items associated with at least one of the one or more files by comparing the hash query with file hashes stored in the cyberattack case studies information database;
generate a file security analysis regarding the one or more files based on the one or more attack correlation information items, wherein the file security analysis comprises at least one indication of a predicted malicious content item predicted as previously brought into the system based at least in part on the one or more attack correlation information items,
wherein querying the cyberattack case studies information database further comprises receiving at least one predictive indicator based at least in part on the attack tree, wherein the file security analysis comprises data representing that the file hash indicates the one or more files comprises the first file and the second file; and
output the file security analysis to a secure media exchange threat intelligence portal associated with the secure media exchange node for authorization of the one or more files.

16. The computer program product according to claim 15, wherein the cyberattack case studies information database comprises a historical threat intelligence database configured to store at least one or more historically received file hashes representing one or more malicious content items, and wherein the computer-readable program code portions comprising an executable portion configured to query the cyberattack case studies information database are further configured to:
query the historical threat intelligence database with the hash query; and
upon determining that the file hash in the hash query matches at least one of the one or more historically received file hashes, generate one or more historical threat indicators representing the one or more malicious content items, wherein the one or more attack correlation information items comprise the one or more historical threat indicators.

17. The computer program product according to claim 15, wherein the cyberattack case studies information database comprises a cyberattack correlation and prediction database configured to store one or more hashes associated with one or more malicious content items, and wherein the computer-readable program code portions comprising an executable portion configured to query the cyberattack case studies information database are further configured to:
query the cyberattack correlation and prediction database with the hash query;
receive one or more predictive indicators, wherein each of the one or more predictive indicators are based on an attack tree mapping associated with the hash file; and
generate the file security analysis based at least on the one or more predictive indicators.

18. The computer program product according to claim 15, wherein the computer-readable program code portions comprising the executable portion are further configured to:
output a notification associated with the file security analysis to a user device of a user associated with the secure media exchange node.

19. The computer-implemented method according to claim 1, the computer-implemented method further comprising:
- identifying a first phase associated with the one or more attack correlation information items based on an attack tree mapping associated with the hash file; and
- predicting the at least one indication of the predicted malicious content item associated with a second phase, wherein the second phase is before the first phase in the attack tree mapping.

20. The computer-implemented method according to claim 1, wherein the predicted malicious content item comprises a non-malicious content item determined to be associated with at least one malicious content item based at least in part on historical file hashes.

* * * * *